(12) United States Patent
Shetzer

(10) Patent No.: US 10,906,661 B2
(45) Date of Patent: Feb. 2, 2021

(54) NACELLE COWL HINGE

(71) Applicant: Rohr, Inc., Chula Vista, CA (US)

(72) Inventor: Daniel J. Shetzer, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 120 days.

(21) Appl. No.: 16/180,747

(22) Filed: Nov. 5, 2018

(65) Prior Publication Data

US 2020/0140104 A1   May 7, 2020

(51) Int. Cl.
*F01D 25/24*    (2006.01)
*B64D 29/06*    (2006.01)
*B64D 29/08*    (2006.01)

(52) U.S. Cl.
CPC ............ *B64D 29/06* (2013.01); *B64D 29/08* (2013.01); *F01D 25/24* (2013.01); *F05D 2220/323* (2013.01); *F05D 2240/10* (2013.01)

(58) Field of Classification Search
None
See application file for complete search history.

(56) References Cited

U.S. PATENT DOCUMENTS

| | | | |
|---|---|---|---|
| 4,044,973 A |   | 8/1977 | Moorehead |
| 4,533,098 A | * | 8/1985 | Bonini ............... B64D 33/04 244/110 B |
| 4,549,708 A | * | 10/1985 | Norris ............... B64D 29/06 244/129.4 |
| 4,679,750 A | * | 7/1987 | Burhans ............ B64D 29/06 244/129.4 |
| 5,046,689 A | * | 9/1991 | Shine ............... B64D 29/06 244/129.4 |
| 5,518,206 A |   | 5/1996 | Arnold |
| 5,864,922 A | * | 2/1999 | Kraft ............... B64D 29/06 16/239 |
| 6,189,832 B1 | * | 2/2001 | Jackson ............ B64C 7/02 244/129.4 |
| 7,255,307 B2 | * | 8/2007 | Mayes ............... B64D 29/06 244/129.5 |
| 7,275,362 B2 | * | 10/2007 | Strunk ............... F02K 1/766 244/110 B |
| 8,613,398 B2 | * | 12/2013 | Calder ............... F02K 1/383 239/265.19 |
| 9,376,215 B2 | * | 6/2016 | Forcier ............ B64D 29/06 |
| 9,845,708 B2 | * | 12/2017 | Forcier ............ B64D 29/06 |
| 9,885,253 B2 | * | 2/2018 | Soria ............... F01D 25/28 |
| 10,464,683 B2 | * | 11/2019 | Pautis ............... B64D 27/18 |
| 2008/0023584 A1 | * | 1/2008 | Beaufort ............ B64D 29/06 244/54 |

(Continued)

FOREIGN PATENT DOCUMENTS

FR    3054827 B1    8/2019

OTHER PUBLICATIONS

EP search report for EP19207281.7 dated Jan. 20, 2020.

*Primary Examiner* — Michael Lebentritt
(74) *Attorney, Agent, or Firm* — Getz Balich LLC

(57) ABSTRACT

A nacelle for a gas turbine engine includes at least one hinge axis extending along the nacelle. At least one cowl is mounted to the nacelle, along the at least one hinge axis, by a plurality of hinges. The plurality of hinges includes at least one latch. The at least one latch includes a clevis and a tang. The clevis and the tang of the at least one latch are configured to receive a hinge pin, through a pin aperture, when the at least one cowl is in a closed condition.

20 Claims, 6 Drawing Sheets

(56) References Cited

U.S. PATENT DOCUMENTS

| | | | | |
|---|---|---|---|---|
| 2009/0126340 A1* | 5/2009 | Lair | ............................ | F02K 1/60 |
| | | | | 60/226.2 |
| 2009/0173823 A1* | 7/2009 | Shetzer | .................. | B64D 29/06 |
| | | | | 244/129.4 |
| 2010/0284806 A1* | 11/2010 | Vauchel | .................. | B64D 29/06 |
| | | | | 415/214.1 |
| 2011/0127370 A1* | 6/2011 | Ramlaoui | .............. | B64D 29/06 |
| | | | | 244/54 |
| 2011/0272533 A1* | 11/2011 | Bourdon | ................ | B64D 29/08 |
| | | | | 244/53 B |
| 2015/0191257 A1* | 7/2015 | Marche | .............. | B64D 45/0005 |
| | | | | 415/118 |
| 2015/0267724 A1* | 9/2015 | Dyer | ..................... | F15B 15/261 |
| | | | | 92/15 |
| 2016/0138623 A1* | 5/2016 | Le Coq | .................. | B64D 29/06 |
| | | | | 239/265.11 |
| 2016/0201371 A1* | 7/2016 | Harding | .................... | B64C 1/14 |
| | | | | 244/129.4 |
| 2016/0273489 A1* | 9/2016 | Bunel | ..................... | B64D 27/18 |
| 2016/0280383 A1* | 9/2016 | Lee | ......................... | B64D 29/08 |
| 2017/0174354 A1 | 6/2017 | Ciprian | | |
| 2018/0127107 A1* | 5/2018 | Delaney | ............. | E05B 15/0006 |
| 2018/0274484 A1* | 9/2018 | Ridray | ...................... | F02K 1/72 |
| 2019/0032377 A1* | 1/2019 | Dyer | .................. | E05B 17/0041 |
| 2019/0112063 A1* | 4/2019 | Byrne | ..................... | F01D 25/24 |
| 2019/0113002 A1* | 4/2019 | Sanz Martinez | ......... | F02K 1/72 |
| 2019/0308739 A1* | 10/2019 | Messina | ................ | B64D 29/06 |
| 2019/0309704 A1* | 10/2019 | Ridray | ...................... | F02K 1/70 |
| 2019/0359343 A1* | 11/2019 | Geliot | .................... | B64D 29/02 |
| 2020/0011272 A1* | 1/2020 | Gormley | ................ | F02K 1/625 |

* cited by examiner

NACELLE COWL HINGE

BACKGROUND

1. Technical Field

This disclosure relates generally to gas turbine engine nacelles, and more particularly to cowl mounting structures.

2. Background Information

Aircraft gas turbine engine nacelles commonly include one or more cowls configured to provide access to engine internal components (e.g., for maintenance or inspections). In many cases, cowls are rotatably mounted to the nacelle by a plurality of hinges. The hinges permit the cowls to be secured in a closed condition during aircraft operation. The hinges further permit the cowls to be rotated about the hinge axis into an open condition when accessing engine internal components or installation/removal of the engine is required.

Quantities and sizes of hinges are generally selected based on aircraft operational needs (e.g., maintaining the structural integrity of the nacelle during flight). However, suitable hinges (e.g., gooseneck hinges) can add considerable weight to the aircraft, thereby degrading performance. Further, because the cowl hinges are oriented internal to the gas turbine engine, the hinges may occupy significant space within the engine requiring engine components to be designed around the hinge locations.

SUMMARY

According to an aspect of the present disclosure, a nacelle for a gas turbine engine includes at least one hinge axis extending along the nacelle. At least one cowl is mounted to the nacelle, along the at least one hinge axis, by at least one hinge. The at least one hinge includes at least one latch. The at least one latch includes a clevis and a tang. The clevis and the tang of the at least one latch are configured to receive a pin, through a pin aperture, when the at least one cowl is in a closed condition.

In the alternative or additionally thereto, in the foregoing aspect, the at least one cowl is configured to rotate about the at least one hinge axis when the pin is removed from each of the at least one latch.

In the alternative or additionally thereto, in the foregoing aspect, the clevis and the tang are configured to receive the pin along a pin axis substantially perpendicular to the at least one hinge axis.

In the alternative or additionally thereto, in the foregoing aspect, the clevis and the tang are configured to receive the pin along a pin axis substantially perpendicular to a longitudinal axis of the gas turbine engine.

In the alternative or additionally thereto, in the foregoing aspect, the pin is configured for threaded engagement with at least one of the nacelle, the clevis, and the tang.

In the alternative or additionally thereto, in the foregoing aspect, all the hinges of the at least one hinge are the at least one latch.

In the alternative or additionally thereto, in the foregoing aspect, at least one of the at least one cowl and the nacelle comprise a recess and the pin aperture is disposed within the recess.

In the alternative or additionally thereto, in the foregoing aspect, the pin includes an outer pin end configured to be retained in the recess when the pin is installed in the at least one latch.

In the alternative or additionally thereto, in the foregoing aspect, the at least one cowl includes a first cowl and a second cowl.

In the alternative or additionally thereto, in the foregoing aspect, the first cowl and the second cowl are mounted to the nacelle about the at least one hinge axis longitudinally adjacent one another.

In the alternative or additionally thereto, in the foregoing aspect, the at least one hinge axis includes a first hinge axis and a second hinge axis. The first cowl is mounted to the nacelle about the first hinge axis and the second cowl is mounted to the nacelle about the second hinge axis, circumferentially adjacent the first cowl.

According to another aspect of the present disclosure, a nacelle for a gas turbine engine includes at least one hinge axis extending longitudinally along the nacelle between a forward end and an aft end of the gas turbine engine. At least one cowl is mounted to the nacelle, along the at least one hinge axis, by at least one hinge comprising at least one latch. The at least one latch is configured to receive a pin through a pin aperture, along a pin axis substantially perpendicular to the at least one hinge axis, when the at least one cowl is in a closed condition. The at least one cowl is configured to rotate about the at least one hinge axis when the pin is removed from each of the at least one latch.

In the alternative or additionally thereto, in the foregoing aspect, the at least one latch is configured to receive the pin along a pin axis substantially perpendicular to a longitudinal axis of the gas turbine engine.

In the alternative or additionally thereto, in the foregoing aspect, at least one of the at least one cowl and the nacelle include a recess and the pin aperture is disposed within the recess.

In the alternative or additionally thereto, in the foregoing aspect, the pin includes an outer pin end configured to be retained in the recess when the pin is installed in the at least one latch.

In the alternative or additionally thereto, in the foregoing aspect, the pin is configured for threaded engagement with at least one of the nacelle, the clevis, and the tang.

According to another aspect of the present disclosure, a rotational equipment assembly includes a turbine and a housing. The housing encompasses at least a portion of the turbine. The housing includes at least one hinge axis extending along the housing. At least one cowl is mounted to the housing, along the at least one hinge axis, by at least one hinge. The at least one hinge includes at least one latch. The at least one latch includes a clevis and a tang. The clevis and the tang are configured to receive a pin, through a pin aperture, when the at least one cowl is in a closed condition.

In the alternative or additionally thereto, in the foregoing aspect, at least one of the at least one cowl and the nacelle include a recess and the pin aperture is disposed within the recess.

In the alternative or additionally thereto, in the foregoing aspect, the pin includes an outer pin end configured to be retained in the recess when the pin is installed in the at least one latch.

In the alternative or additionally thereto, in the foregoing aspect, the clevis and the tang are configured to receive the pin along a pin axis substantially perpendicular to the at least one hinge axis.

The present disclosure, and all its aspects, embodiments and advantages associated therewith will become more readily apparent in view of the detailed description provided below, including the accompanying drawings.

DETAILED DESCRIPTION

Figure 1:
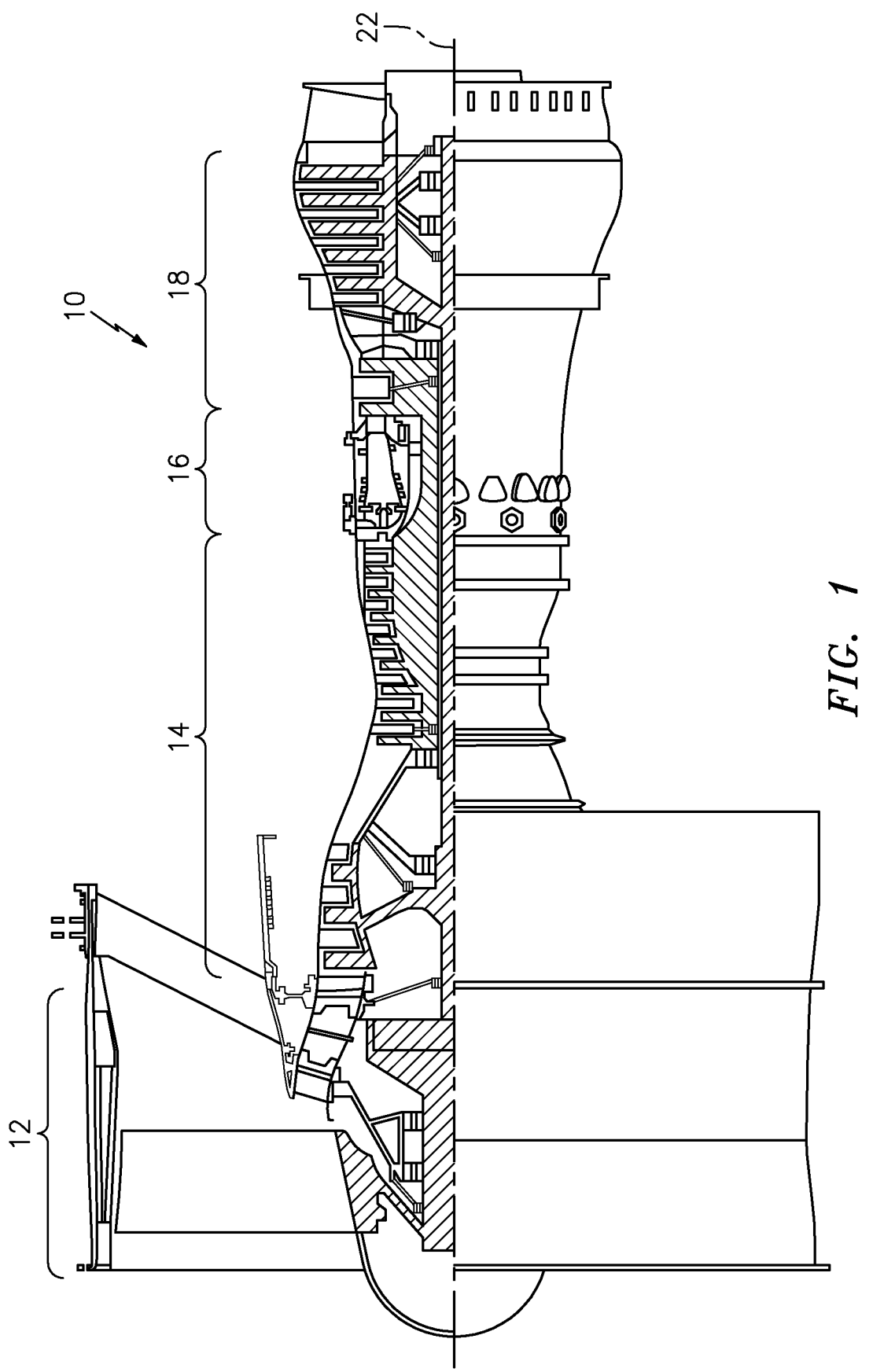
FIG. 1 is a side cross-sectional view of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
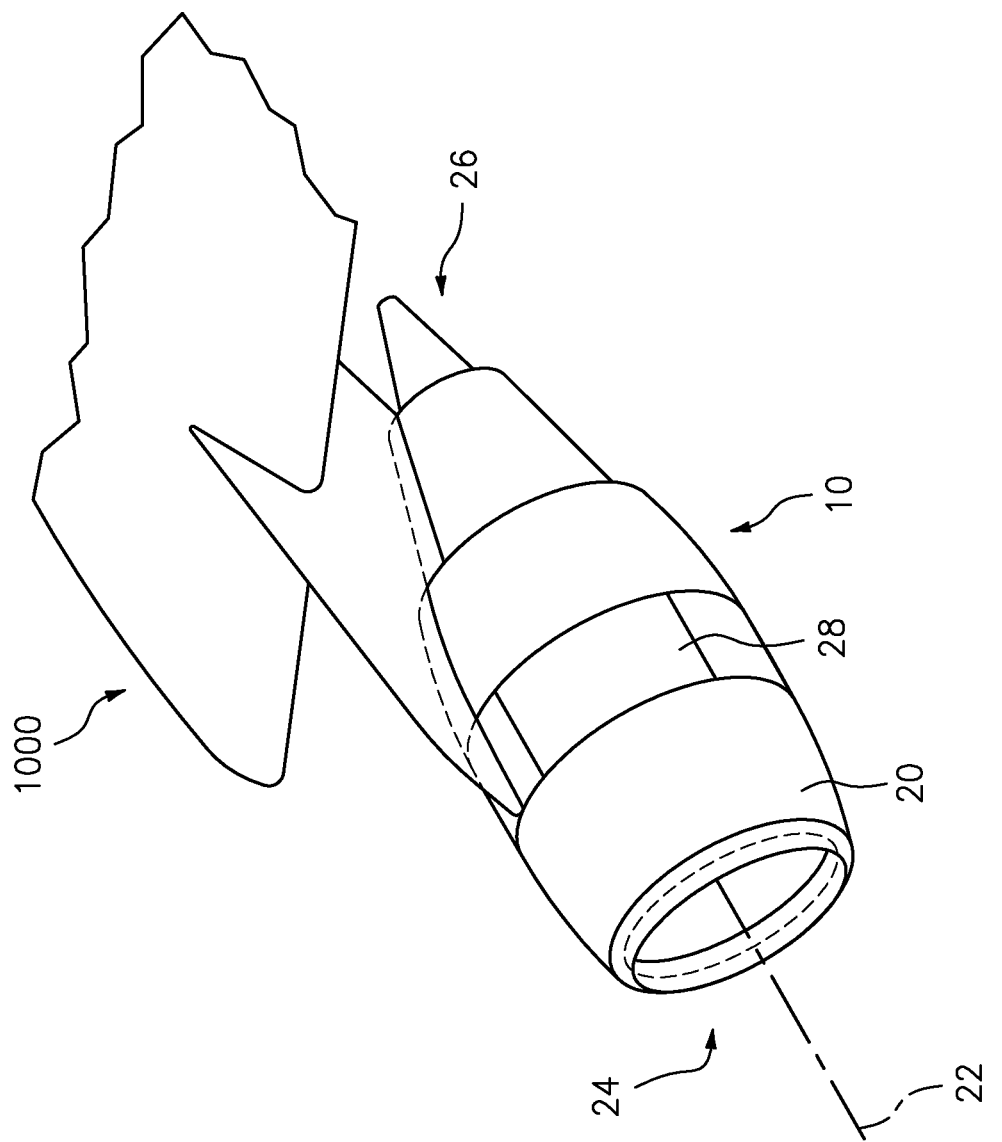
FIG. 2 is a perspective view of an exemplary gas turbine engine.

Referring to FIGS. 1 and 2, a gas turbine engine 10 of, for example, an aircraft 1000, is generally illustrated. The gas turbine engine 10 generally includes a fan section 12, a compressor section 14, a combustor section 16, and a turbine section 18. The gas turbine engine 10 further includes a nacelle 20 defining a housing of the gas turbine engine 10 about a longitudinal axis 22. The longitudinal axis 22 extends through the center of the gas turbine engine 10 between a forward end 24 and an aft end 26 of the gas turbine engine 10. The nacelle 20 includes at least one cowl 28 configured to permit access to internal components of the gas turbine engine 10 or installation or removal of gas turbine engine 10 components (i.e., through the nacelle 20). In one embodiment, for example, the at least one cowl 28 may be repositioned from a closed condition to an open condition to allow access to the fan section 12 of the gas turbine engine 10. In other embodiments, the at least one cowl 28 may permit access to, for example, one or more of the fan section 12, the compressor section 14, the combustor section 16, the turbine section 18, or any other part of the gas turbine engine 10.

Figure 3:
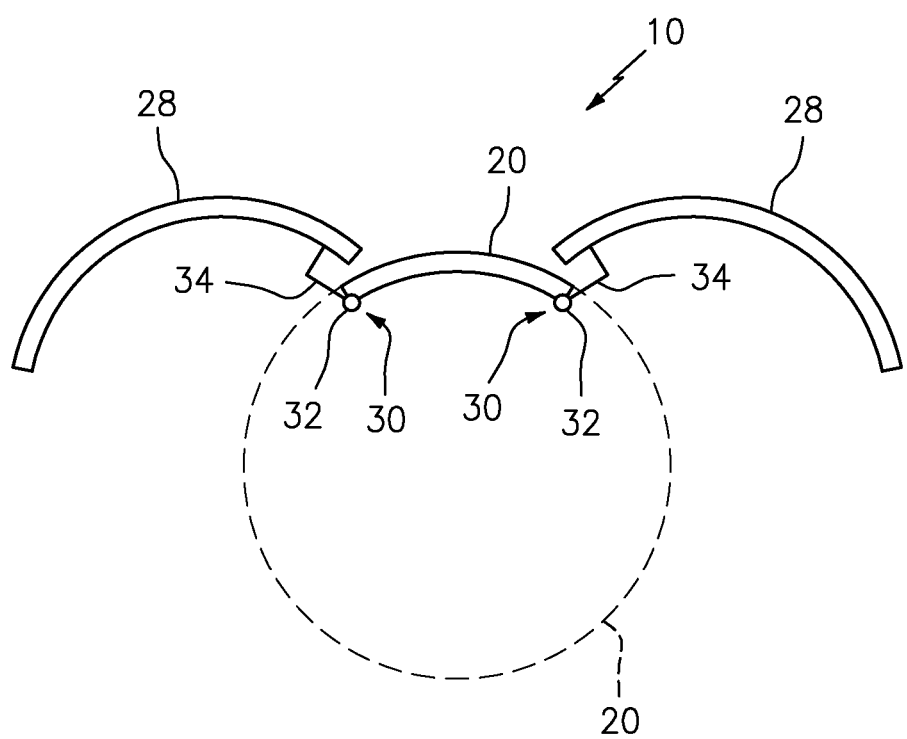
FIG. 3 is a front view of the gas turbine engine of FIG. 1 with cowls in an open condition.
Figure 4:
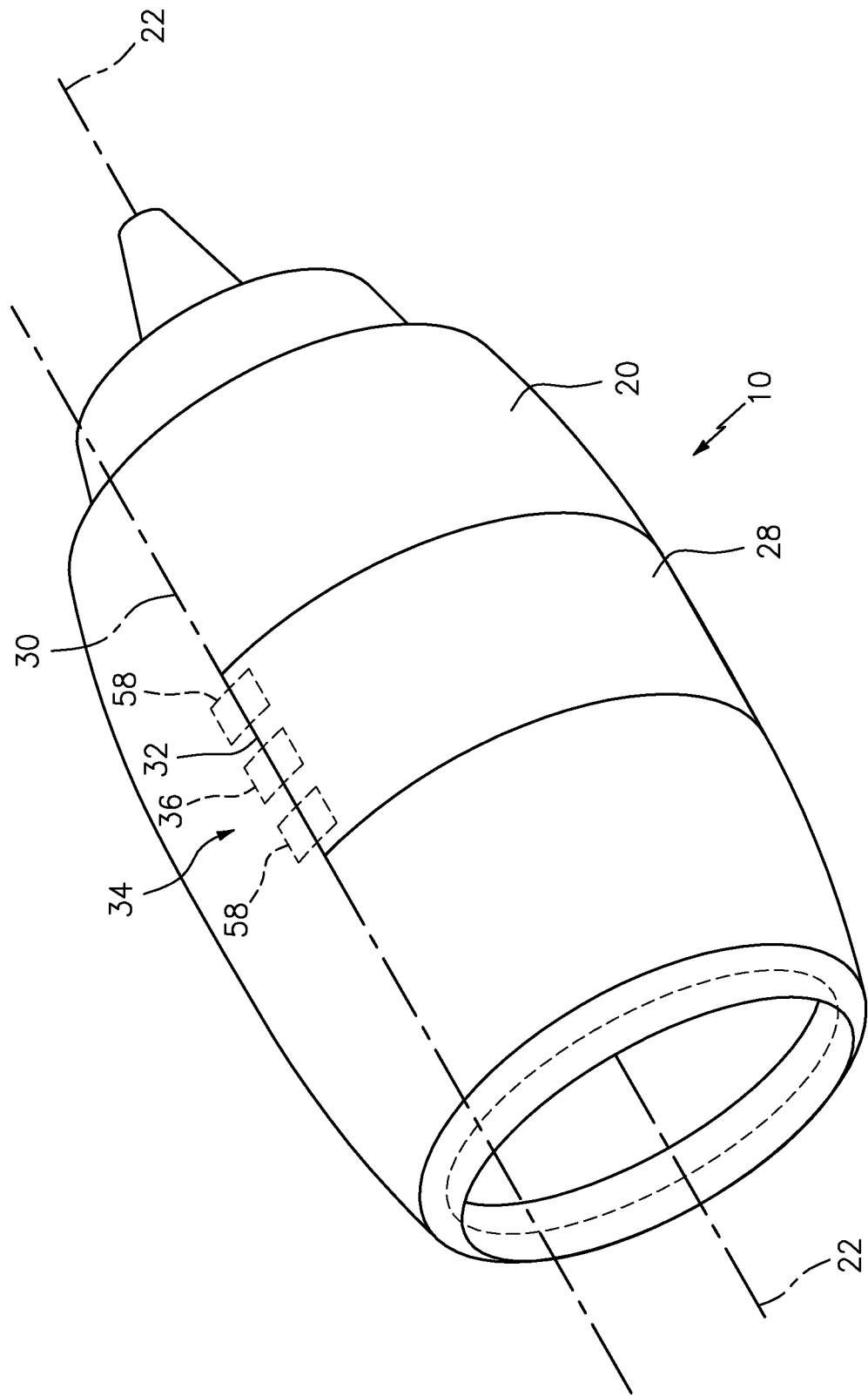
FIG. 4 is a perspective view of the gas turbine engine of FIG. 1

As used herein, a "closed condition" will be used to refer to the at least one cowl 28 in a position so as to form a substantially continuous surface with the nacelle 20 (e.g., the at least one cowl 28 is positioned for flight) (see, e.g., FIG. 4). "Open condition" will be used to refer to the at least one cowl 28 in a position other than the closed condition (e.g., the at least one cowl 28 is partially open, fully open, or removed from the nacelle 20) (see, e.g., FIG. 3). While the aspects of the present disclosure will be discussed with respect to aircraft nacelles, these aspects are also applicable to other types of machinery having cowls. For example, aspects of the present disclosure could be configured with a housing of a rotational equipment assembly such as industrial gas turbine engines, wind turbines, etc.

Referring to FIGS. 3 and 4, the nacelle 20 includes at least one hinge axis 30. In some embodiments, the at least one hinge axis 30 may extend longitudinally along the nacelle 20 between the forward end 24 and the aft end 26 of the gas turbine engine 10. For example, the at least one hinge axis 30 may be parallel to the longitudinal axis 22. In other embodiments, the at least one hinge axis 30 may be oriented in any suitable way to permit access to engine components by positioning the least one cowl 28 in an open condition. The nacelle 20 also includes at least one hinge line 32, defining an interface between the nacelle 20 and the at least one cowl 28. The at least one hinge line 32 is disposed along at least a portion of the respective at least one hinge axis 30. For example, in one embodiment, the at least one hinge line 32 may have a longitudinal length equal to or greater than a longitudinal length of the fan section 12, thereby allowing access to the fan section 12 when the respective at least one cowl 28 is in an open position.

The at least one cowl 28 is mounted to the nacelle 20 along the respective at least one hinge line 32 (and the at least one hinge axis 30) by at least one hinge 34 (e.g., 1, 2, 3, 4, 5, or more hinges). The number of hinges in the at least one hinge 34 may be based on cowl design considerations, for example, the longitudinal length or the weight of the at least one cowl 28. As will be discussed in greater detail, the at least one hinge 34 may be one or more of any different type of hinge appropriate for mounting the at least one cowl 28 to the nacelle 20. The at least one hinge 34 may also include hinges of different types and sizes. As one of ordinary skill in the art will appreciate, the at least one cowl 28 may be additionally mounted to the nacelle 20 or other gas turbine engine 10 components by one or more other components, for example, a latching mechanism, a hydraulic actuator, etc.

Figure 5:
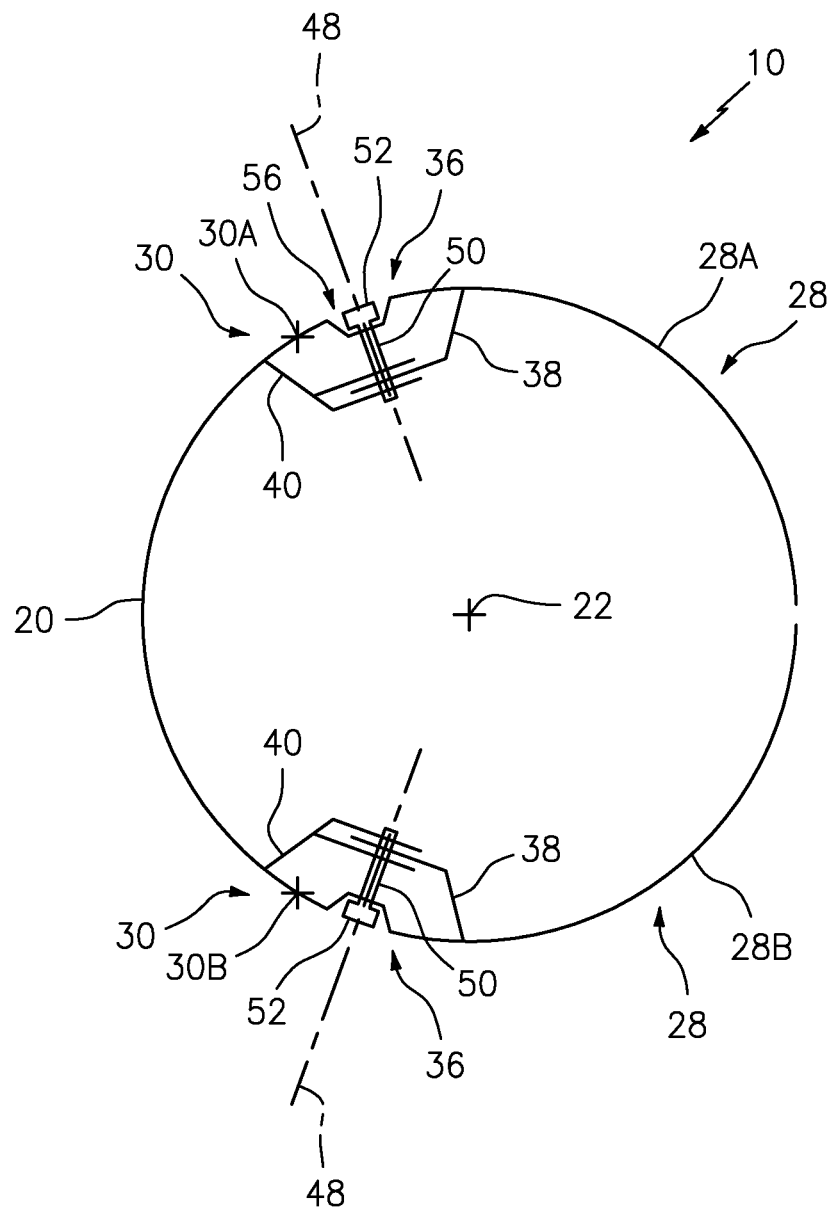
FIG. 5 is a front cross-sectional view of an exemplary gas turbine engine illustrating an exemplary latch.

Aspects of the present disclosure may be realized in various configurations of the at least one cowl 28. Referring to FIG. 5, in some embodiments, the at least one cowl 28 may include a first cowl 28A and a second cowl 28B. The first cowl 28A and the second cowl 28B may be mounted to the nacelle 20 (e.g., to one or more of the at least one hinge line 32) about the at least one hinge axis 30. In this embodiment, the first cowl 28A and the second cowl 28B may or may not be longitudinally adjacent one another. In another embodiment, the at least one hinge axis 30 may include a first hinge axis 30A and a second hinge axis 30B. The first cowl 28A may be mounted to the nacelle 20 about the first hinge axis 30A and the second cowl 28B may be mounted to the nacelle about the second hinge axis 30B. In this embodiment, the first cowl 28A and the second cowl 28B may or may not be longitudinally adjacent one another (see, e.g., FIG. 5). Additionally, the first hinge axis 30A and the second hinge axis 30B may or may not be parallel to one another.

Figure 6:
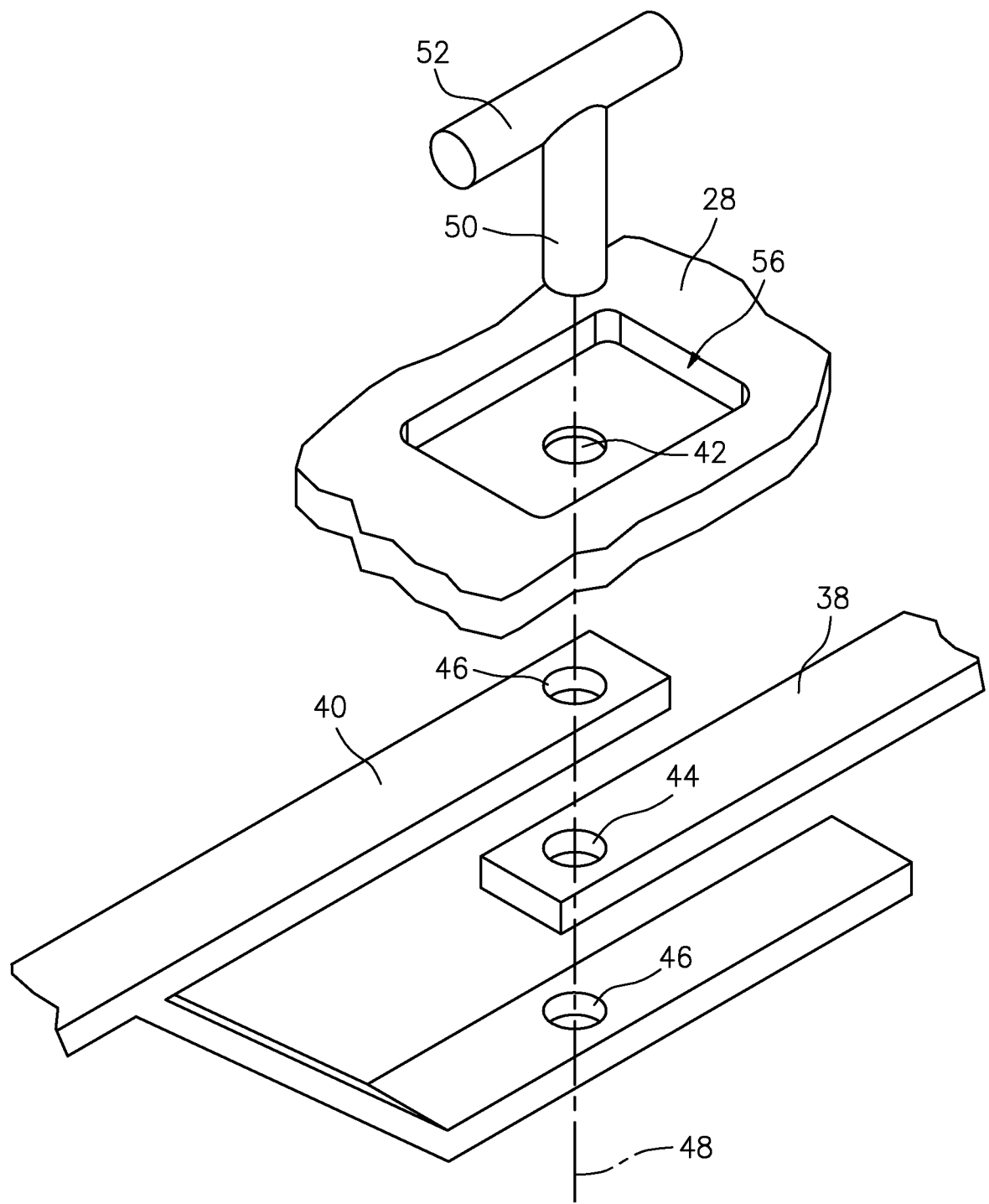
FIG. 6 is an exploded perspective view of the latch of FIG. 5.

Referring to FIGS. 4-6, the at least one hinge 34 includes at least one latch 36. As will be discussed in further detail, the at least one hinge 34 may also include at least one rotatable hinge 58 (e.g., a traditional hinge such as a gooseneck hinge) configured to rotatably mount the at least one cowl 28 to the nacelle 20. The latch 36 includes a tang 38 and a clevis 40 configured to receive the tang 38 when the at least one cowl 28 is in a closed condition. The at least one cowl 28, tang 38, and clevis 40 include a respective pin aperture 42, tang aperture 44, and at least one clevis aperture 46. The pin aperture 42, tang aperture 44, and at least one clevis aperture 46 are aligned about a pin axis 48 when the at least one cowl 28 is in a closed condition. When the at least one cowl 28 is in a closed condition, the latch 36 is configured to receive a pin 50 along the pin axis 48 (i.e., through the pin aperture 42, tang aperture 44, and at least one clevis aperture 46). For purposes of clarity, the pin aperture 42 will be described herein as being disposed in the at least one cowl 28, however, in some embodiments, the pin aperture 42 may be disposed in nacelle 20. In still other embodiments, the pin aperture 42 may be disposed in both the nacelle 20 and the at least one cowl 28, for example, at the hinge axis 30. The at least one latch 36 may secure the at least one cowl 28 to the nacelle 20 while having a lighter weight and/or consuming less space within an interior of the nacelle 20 as compared to a traditional cowl hinge (e.g., rotatable hinge 58).

The pin 50 is inserted through the latch 36 along the pin axis 48 from a position external to the gas turbine engine 10. Insertion of the pin 50 into the latch 36 engages the tang 38 and clevis 40, thereby securing the at least one cowl 28 in a closed condition. In some embodiments, the pin axis 48 may be substantially perpendicular to the longitudinal axis 22. In some other embodiments, the pin axis 48 may alternatively or additionally be substantially perpendicular to the at least one hinge axis 30. As one of ordinary skill in the art will appreciate, the term "substantially perpendicular", as used herein, may include a range of pin axes, not precisely perpendicular, which permit insertion of the pin 50 through the pin aperture 42, tang aperture 44, and at least one clevis aperture 46 from a position external to the gas turbine engine 10.

The pin 50 may be retained within the latch 36 by a number of different configurations. In some embodiments, for example, the pin 50 is configured for threaded engagement with one or more of the nacelle 20, the clevis 40, and the tang 38. However, any suitable mechanism for retention of the pin 50 within the latch 36 may be used (e.g., ball-lock pin or quarter-turn fastener retention systems). In some other embodiments, the nacelle 20 may be configured to receive, for example, a cover plate configured to engage with the nacelle 20 (e.g., by threaded engagement) and cover the pin 50 and latch 36. In said other embodiments, retention of the pin 50 by threaded engagement, ball-lock pin, etc., as discussed above, may not be necessary.

As illustrated in FIGS. 5 and 6, the at least one cowl 28 may include a recess 56 disposed about the pin aperture 42 (i.e., the pin aperture 42 is disposed within the recess 56). As discussed above, the pin aperture 42 may alternatively be disposed in one or both of the at least one cowl 28 and the nacelle 20. Correspondingly, the recess may also be disposed on one or both of the at least one cowl 28 and the nacelle 20, as appropriate.

The pin 50 includes an outer pin end 52 configured to be positioned outside the at least one cowl 28 when the pin 50 is installed (e.g., fully inserted) in the at least one latch 36. The outer pin end 52 may be partially or fully encompassed by the recess 56 in a radial direction with respect to the longitudinal axis 22. The outer pin end 52 may be configured to assist an operator (e.g., a technician) with installation or removal of the pin 50 from the at least one latch 36 (e.g., by operating as a handle). In still other embodiments, the outer pin end 52 may be configured to form continuous exterior surface with the at least one cowl 28 along at least a portion of the recess 56 (e.g., to satisfy aerodynamic requirements of the nacelle 20).

Referring again to FIG. 4, the at least one hinge 34 may include different combinations of the at least one latch 36 and the at least one rotatable hinge 58. For example, the outer-most hinges of the at least one hinge 34 along the at least one hinge line 32 may be rotatable hinges 58 (see, e.g., FIG. 4). In other embodiments, the at least one hinge 34 may include any other combination of hinges appropriately suited to mount the at least one cowl 28 to the nacelle 20 (e.g., alternating at least one latch 36 and at least one rotatable hinge 58 along the hinge line). Varying quantities of the at least one latch 36 and the at least one rotatable hinge 58 may be used. As will be discussed in further detail, in some embodiments, each hinge of the at least one hinge 34 may be the at least one latch 36.

Embodiments of the at least one hinge 34 including both the at least one latch 36 and the at least one rotatable hinge 58 may allow the at least one cowl 28 to be secured in a closed condition when the one or more of the at least one latch 36 has a pin 50 installed therein. Additionally, when each pin 50 is removed from each of the at least one latch 36, the at least one cowl 28 may be configured to rotate about the at least one hinge axis 30 (e.g., by operation of the at least one rotatable hinge 58). For example, a technician performing an inspection of the gas turbine engine 10 may remove each pin 50 from each of the at least one latch 36 and then rotate the respective at least one cowl 28 to an open condition. In other embodiments, wherein each hinge of the at least one hinge 34 is the at least one latch 36, the at least one cowl 28 may be demountably coupled to the nacelle 20. For example, a technician performing an inspection of the gas turbine engine 10 may remove each pin 50 from each of the at least one latch 36 and then demount the at least one cowl 28 from the nacelle 20.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A nacelle for a gas turbine engine comprising:
   at least one hinge axis extending along the nacelle; and
   at least one cowl mounted to the nacelle, along the at least one hinge axis, by at least one hinge;
   wherein the at least one hinge comprises at least one latch, the at least one latch comprising a clevis and a tang;
   wherein the clevis and the tang of the at least one latch are configured to receive a pin, through a pin aperture, when the at least one cowl is in a closed condition; and
   wherein the clevis and the tang are configured to receive the pin along a pin axis substantially perpendicular to the at least one hinge axis.

2. The nacelle of claim 1, wherein the at least one cowl is configured to rotate about the at least one hinge axis when the pin is removed from each of the at least one latch.

3. The nacelle of claim 1, wherein the clevis and the tang are configured to receive the pin along a pin axis substantially perpendicular to a longitudinal axis of the gas turbine engine.

4. The nacelle of claim 1, wherein the pin is configured for threaded engagement with at least one of the nacelle, the clevis, and the tang.

5. The nacelle of claim 1, wherein all the hinges of the at least one hinge are the at least one latch.

6. The nacelle of claim 1 wherein:
at least one of the at least one cowl and the nacelle comprise a recess; and
the pin aperture is disposed within the recess.

7. The nacelle of claim 6, wherein the pin comprises an outer pin end configured to be retained in the recess when the pin is installed in the at least one latch.

8. The nacelle of claim 1, wherein the at least one cowl comprises a first cowl and a second cowl.

9. The nacelle of claim 8, wherein the first cowl and the second cowl are mounted to the nacelle about the at least one hinge axis longitudinally adjacent one another.

10. The nacelle of claim 8:
wherein the at least one hinge axis comprises a first hinge axis and a second hinge axis; and
wherein the first cowl is mounted to the nacelle about the first hinge axis and the second cowl is mounted to the nacelle about the second hinge axis, circumferentially adjacent the first cowl.

11. A nacelle for a gas turbine engine comprising:
at least one hinge axis extending longitudinally along the nacelle between a forward end and an aft end of the gas turbine engine; and
at least one cowl mounted to the nacelle, along the at least one hinge axis, by at least one hinge comprising at least one latch;
wherein the at least one latch is configured to receive a pin through a pin aperture, along a pin axis substantially perpendicular to the at least one hinge axis, when the at least one cowl is in a closed condition; and
wherein the at least one cowl is configured to rotate about the at least one hinge axis when the pin is removed from each of the at least one latch.

12. The nacelle of claim 11, wherein the at least one latch is configured to receive the pin along a pin axis substantially perpendicular to a longitudinal axis of the gas turbine engine.

13. The nacelle of claim 11 wherein:
at least one of the at least one cowl and the nacelle comprise a recess; and
the pin aperture is disposed within the recess.

14. The nacelle of claim 13, wherein the pin comprises an outer pin end configured to be retained in the recess when the pin is installed in the at least one latch.

15. The nacelle of claim 11, wherein the pin is configured for threaded engagement with the at least one latch.

16. A rotational equipment assembly comprising:
a turbine; and
a housing encompassing at least a portion of the turbine, the housing comprising:
at least one hinge axis extending along the housing; and
at least one cowl mounted to the housing, along the at least one hinge axis, by at least one hinge;
wherein the at least one hinge comprises at least one latch, the at least one latch comprising a clevis and a tang;
wherein the clevis and the tang are configured to receive a pin, through a pin aperture extending through the housing, the clevis, and the tang, when the at least one cowl is in a closed condition.

17. The assembly of claim 16 wherein:
at least one of the at least one cowl and the housing comprise a recess; and
the pin aperture is disposed within the recess.

18. The assembly of claim 17, wherein the pin comprises an outer pin end configured to be retained in the recess when the pin is installed in the at least one latch.

19. The assembly of claim 18, wherein the clevis and the tang are configured to receive the pin along a pin axis substantially perpendicular to the at least one hinge axis.

20. The nacelle of claim 11, wherein the at least one cowl is configured to be rotationally fixed about the at least one hinge axis when the pin is installed in the at least one latch.

* * * * *